United States Patent [19]

Auerbach et al.

[11] Patent Number: 4,689,373
[45] Date of Patent: Aug. 25, 1987

[54] USE OF AMINO RESINS TO IMPROVE PROPERTIES OF OXYMETHYLENE POLYMER MOLDING COMPOSITIONS

[75] Inventors: Andrew B. Auerbach, Livingston, N.J.; Derrick B. McKie, Brooklyn, N.Y.

[73] Assignee: Celanese Corporation, New York, N.Y.

[21] Appl. No.: 790,930

[22] Filed: Oct. 24, 1985

[51] Int. Cl.$^4$ .............................................. C08L 61/02
[52] U.S. Cl. .................................... 525/398; 525/399
[58] Field of Search ........................ 525/398, 399, 456

[56] References Cited

U.S. PATENT DOCUMENTS 4,386,178  5/1983  Schuette et al. ................ 525/398 X

FOREIGN PATENT DOCUMENTS 2921167  4/1980  Fed. Rep. of Germany ...... 525/398

*Primary Examiner*—Theodore E. Pertilla
*Attorney, Agent, or Firm*—Burns, Doane, Swecker & Mathis

[57] ABSTRACT

Mechanical properties, especially tensile and impact properties, of molding compositions comprising at least one thermoplastic oxymethylene polymer and optionally also containing an impact-enhancing amount of a polyurethane, can be improved by incorporating into the molding composition an effective amount greater than 10 weight percent of the composition of a monomeric formaldehyde/amino compound condensation product or prepolymeric amino resin selected from condensation products of formaldehyde and at least one of guanidine, urea, a substituted or unsubstituted guanamine and melamine, preferably having a degree of polymerization of about 2–5. An acid catalyst can be employed to promote the cross-linking reactions of the prepolymeric amino resin. In the compositions comprising polyurethane, amounts of the amino resin of less than 10 weight percent can be used.

30 Claims, 1 Drawing Figure

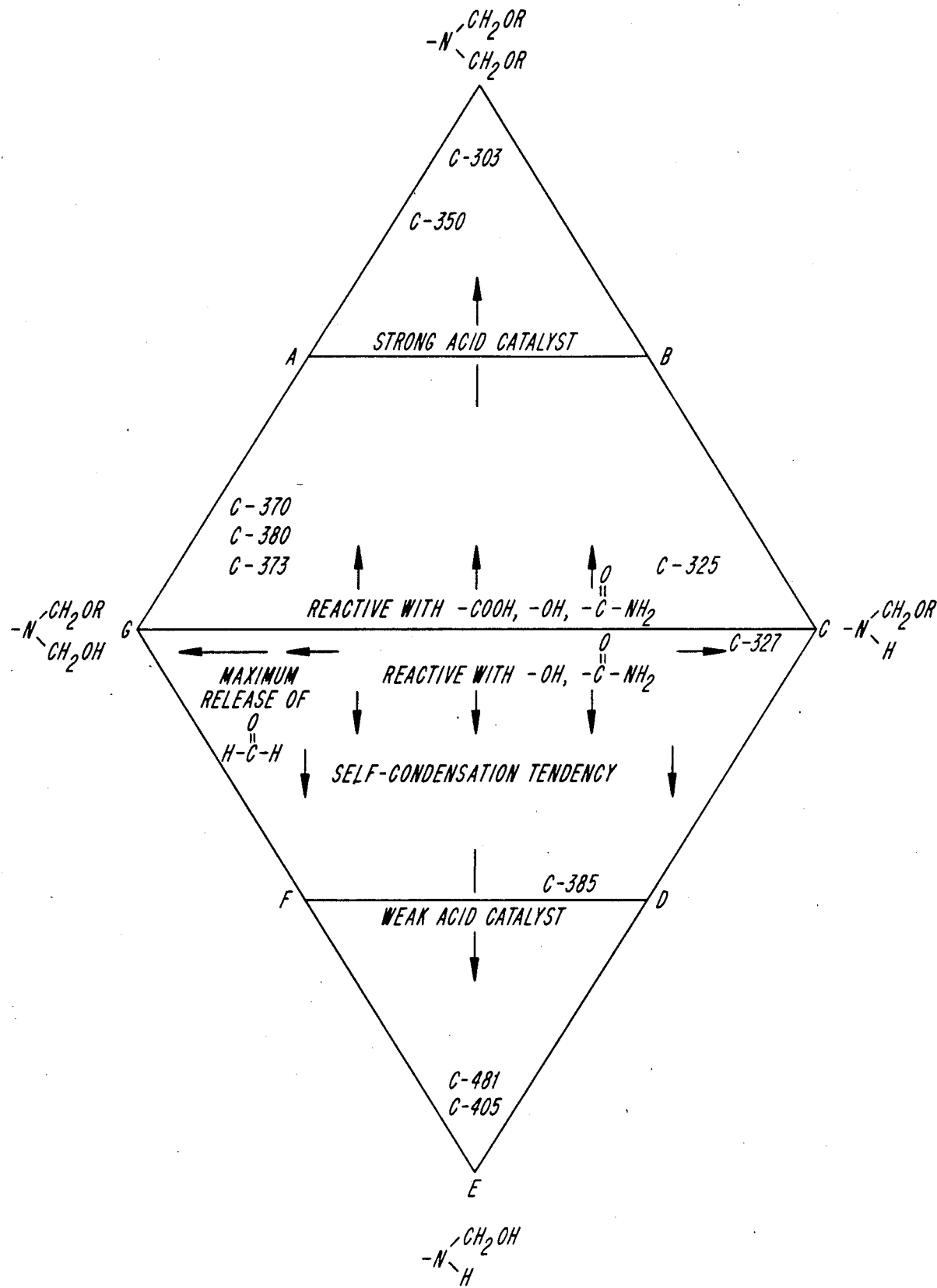

USE OF AMINO RESINS TO IMPROVE PROPERTIES OF OXYMETHYLENE POLYMER MOLDING COMPOSITIONS

BACKGROUND OF THE INVENTION

The present invention relates to thermoplastic polymer molding compositions. More particularly, the present invention relates to thermoplastic polymer molding compositions based on polymers having hydroxy, amine or amide end groups, such as oxymethylene polymers, polyamines and polyamides, that contain an effective amount of a prepolymeric methylol amino compound or resin as a coupling agent and can be molded into articles having enhanced mechanical properties, particularly enhanced elongation and impact strength.

Oxymethylene polymers having recurring —CH$_2$O— units have been known for many years. They may be prepared by the polymerization of anhydrous formaldehyde or by the polymerization of trioxane, which is a cyclic trimer of formaldehyde.

The usefulness of oxymethylene polymers in molding compositions has also been known for years. For example, U.S. Pat. No. 3,275,604 discloses a moldable oxymethylene copolymer comprising oxymethylene groups and oxyethylene groups, with said oxyethylene groups having a —CH$_2$OR group pendant therefrom, which may be prepared by polymerizing a source of oxymethylene units such as trioxane with a glycidyl ether.

Various additives and improvements to oxymethylene molding compositions have been developed. For example, to permit molding objects of such compositions at relatively high temperatures without adversely affecting the surface characteristics of the molded objects, thermal stabilizers have been included in minor proportions. Compounds used as thermal stabilizers have included amine-substituted triazine monomers (U.S Pat. No. 4,342,680), hydroxymethylol cyanoguanamine (U.S. Pat. No. 3,626,024), and cross-linked melamine-formaldehyde polycondensates (U.S. Pat. Nos. 4,139,575 and 4,230,606). U.S. Pat. No. 4,386,178 discloses polyacetal or oxymethylene polymer molding materials containing as a thermal stabilizer from 0.1 to 10 weight percent of melamine resin described as a melamineformaldehyde condensate having a mean degree of polymerization of from 1.2 to 6.0 and a melamine:formaldehyde ratio of from 1:2 to 1:5.5, which has been partially etherified with a C$_1$–C$_4$ alkanol so that the ratio of melamine:ether radicals is from 1:1.5 to 1:5.0 and the ratio of melamine:free methylol groups is from 1:0.5 to 1:3. The molding compositions can contain various conventional additives, including fillers of, e.g., glass fibers. The examples disclose increases in the melt index of the compositions containing the stabilizer, but no tests of mechanical properties of objects molded therefrom.

Numerous efforts have been made to improve the mechanical properties of objects molded from oxymethylene polymer molding compositions containing fibrous reinforcing agents such as glass fibers. For example, U.S. Pat. No. 3,963,668 discloses thermoplastic molding compositions of polyoxymethylenes containing 10–50 weight percent glass fibers and 0.1–5.0 weight percent of an alkoxymethyl urea, the inclusion of which is said to improve the tensile strength, flexural strength and impact resistance of molded objects. Conventional additives such as thermal stablizers can be included. German Patent Specification DE-OS No. 2,921,167 discloses molding compositions of polyoxymethylenes containing 10–50 weight percent glass fibers and from 0 1 to 3 weight percent of an alkoxymethylmelamine monomer containing an average of at least two alkoxymethyl groups. This additive is said to improve the tensile, bending and impact strengths of objects molded from the resulting compositions, without discoloration in the molding process.

Despite the various efforts to improve the properties of thermoplastic polymer molding compositions based on polymers such as oxymethylene polymers, there is further room for improvement in these materials, particularly as to the mechanical properties of objects molded from thermally stabilized impact resistant molding compositions.

Accordingly, it is an object of the present invention to provide a thermoplastic polymer molding composition based on a polymer with functional end groups that can be molded into objects which exhibit enhanced mechanical properties.

Another object of the present invention is to provide an improved oxymethylene polymer molding composition that can be molded into articles which exhibit enhanced mechanical properties such as tensile elongation and flexural properties and impact strength.

Still another object of the present invention is to provide an improved oxymethylene polymer molding composition that is thermally stable at useful molding temperatures.

These and other objects, as well as the scope, nature and utilization of the present invention, will be apparent to those skilled in the art from the following description, the drawing, and appended claims.

SUMMARY OF THE INVENTION

In accordance with the present invention, a molding composition capable of being molded to form objects exhibiting enhanced mechanical properties comprises an intimate blend of:

(a) a major portion of at least one oxymethylene polymer, and (b) an amount of an amino prepolymer effective to improve at least one of the elongational, flexural and impact properties of objects molded of the composition, the resin being present in an amount in the range of from greater than about ten to about forty weight percent of the molding composition. The prepolymer can be a condensation product of formaldehyde and at least one of guanidine, urea, a substituted or unsubstituted guanamine or melamine.

In accordance with another embodiment of the present invention, the molding composition further comprises a polyurethane in an amount effective to improve impact properties of molded articles.

In preferred embodiments, the prepolymer has a degree of polymerization of about 2–5, and an acid catalyst can be used to promote the cross-linking of the resin to couple the oxymethylene polymer and the polyurethane when present.

Further in accordance with the invention, a process is provided for producing molded objects from a thermoplastic molding composition comprising an oxymethylene polymer and greater than ten weight percent of a methylol amino prepolymer under temperature and pressure conditions effective to improve the impact and elongational properties of the molded objects compared with objects molded of such compositions comprising less than 10 weight percent of such a methylol amino prepolymer.

Still further in accordance with the invention, a process is provided for producing molded objects from a thermoplastic molding composition comprising a major portion of an oxymethylene polymer, an amount of a polyurethane effective to improve the impact and elongational properties of the molded objects, a methylol amino prepolymer in an amount effective to improve elongational and flexural properties of the molded objects, and, optionally, an acid catalyst to promote the crosslinking reactions of the resin.

BRIEF DESCRIPTION OF THE DRAWING

FIG. 1 is a plot of reactivity characteristics of various types of methylol melamine resins

DESCRIPTION OF THE PREFERRED EMBODIMENTS

The present invention makes use of methylol amino prepolymers to plasticize as well as react with and couple the base polymer in a molding composition during a thermal process such as injection molding or extrusion. Since these amino prepolymers are reactive to hydroxyl, amine or amide groups, they can be utilized to react with a broad spectrum of solid thermoplastic polymers, including polyacetals or oxymethylene polymers with suitable end groups (e.g., —OH).

Depending upon the degree of methylolation of the amino prepolymer and the degree of alkylation of the resulting methylol groups, an acid catalyst may be useful in promoting the crosslinking reaction which accomplishes this coupling. These prepolymers can also be used to react with various base polymers in blends with other thermoplastic or thermosetting polymers, optionally containing various reinforcing agents or fillers known in the art. Since the base polymers preferred at present for the practice of the invention include oxymethylene polymers, the invention is discussed in terms of these materials, but should not be considered as limited thereto.

OXYMETHYLENE POLYMER

The oxymethylene polymers usable in the molding composition of the present invention are well known in the art. They are characterized by having recurring oxymethylene groups or units, i.e., —CH$_2$O—. The term oxymethylene polymer as used herein is intended to include any thermoplastic or moldable, solid oxymethylene polymer having —CH$_2$O— groups comprising at least about 58 percent of the recurring units, for example, homopolymer, copolymers, terpolymers and the like.

Typically, the homopolymers are prepared by the polymerization of anhydrous formaldehyde or by the polymerization of trioxane, which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in U.S. Pat. No. 2,989,506.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) —OCH$_2$ groups interspersed with (b) groups represented by the general formula:

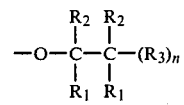

wherein each R$_1$ and R$_2$ is selected from the group consisting of hydrogen, lower alkyl and halogen-substituted lower alkyl radicals, each R$_3$ is selected from the group consisting of ethylene, oxyethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g., BF$_3$, PF$_5$, and the like) or other acids (e.g., HClO$_4$, 1% H$_2$SO$_4$, and the like).

In general, the cyclic ethers employed in making the preferred oxymethylene copolymers are those represented by the general formula:

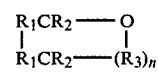

wherein each R$_1$ and R$_2$ is independently selected from the group consisting of hydrogen; lower alkyl and halogen-substituted lower alkyl radicals; and each R$_3$ is selected from the group consisting of methylene, oxyethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

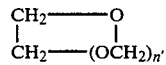

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably used in the molding compositions of the present invention are thermoplastic materials having a melting point of at least 150° C., and normally are millable or processable at a temperature of from about 180° C. to about 220° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alpha-pinene).

The oxymethylene copolymer used is preferably one that has been preliminarily stabilized to a substantial degree. Such stabilizing technique may take the form of stabilization by degradation of the molecular ends of the polymer chain to a point where a satisfactorily stable carbon-to-carbon linkage exists at each end. For example, such degradation may be effected by hydrolysis, as disclosed in U.S. Pat. No. 3,219,623 to Berardinelli.

A preferred oxymethylene copolymer of ethylene oxide or dioxolane is melt hydrolyzed with triethylamine with the aid of an extruder or solution hydrolyzed in aqueous methanol with triethylamine.

If desired, the oxymethylene polymers may be endcapped by techniques known to those skilled in the art. A preferred end-capping technique is accomplished by acetylation with acetic anhydride in the presence of sodium acetate catalyst. A preferred oxymethylene copolymer is commercially available from Celanese Corporation under the trademark "CELCON" acetal copolymer, and especially preferred is "CELCON" M90, which has a melt index of about 9.0 g./10 min. when tested in accordance with ASTM D1238-82.

With respect to the oxyethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

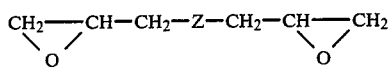

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide; diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1,4-diol and 2-diethyl-4-dimethyl-cyclobutane-1,3-diol, with butanediol diglycidyl ethers being most preferred. Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer. The trioxane based terpolymer polymerization is advantageously carried out at temperatures at which trioxane does not crystallize out, that is, at a temperature within the range of $-50°$ C. to $+100°$ C., depending on the solvent used, and in the absence of a solvent at a temperature within the range of $+20°$ C. to $+100°$ C.

As trioxane-based terpolymer polymerization catalysts, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent. Since the catalysts tend to decompose the terpolymer, the catalyst is advantageously neutralized immediately after the polymerization, for example, with ammonia or methanolic or acetonic amine solu- tions.

The unstable terminal hemiacetal groups may be removed from the terpolymer in the same manner as known for other oxymethylene polymers. Advantageously, the terpolymer is suspended in aqueous ammonia at temperatures within the range of 100° C. to 200° C., and if desired, in the presence of a swelling agent such as ethanol or n-propanol. Alternatively, the terpolymer is dissolved in an alkaline medium at temperatures above 180° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

Alternatively, the terpolymer can be subjected to heterogeneous hydrolysis wherein water, with or without catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° C. to 250° C. for a specified period of time, and then washed with water and dried or centrifuged.

A preferred oxyethylene terpolymer is commercially available from Celanese Corporation under the trademark "CELCON" U10, and is a butanediol diglycidyl ether ethylene oxide trioxane terpolymer containing about 0.05 weight percent, 2.0 weight percent, and 97.95 weight percent of each component, respectively.

METHYLOL AMINO RESINS

Various monomeric amino compounds and amino resins, "amino" being defined as including either amino or amido groups, can be used in the present invention. The term "prepolymer" is hereby defined to include condensation products of formaldehyde and amino compounds, ranging from methylol amino monomeric compounds to prepolymeric resins, i.e., products with a degree of polymerization from 1 to about 5. The resins are preferably prepared by condensing the amino compound with formaldehyde to produce a prepolymeric resin. Exemplary amino compounds include guanidine, having the formula $NH_2C(NH)NH_2$, urea, having the formula $CO(NH_2)_2$, or melamine, i.e., 2,4,6-triamino-1,3,5-triazine, or a substituted guanamine, chemically identified as 2,4-diamino-6-R-1,3,5-triazine, having the formula

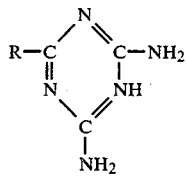

wherein R is a hydrocarbon or a halo- or nitro-substituted hydrocarbon group. Thus, R may be an alkyl group containing 1 to 22, preferably 12 to 18 carbon atoms; an aryl group such as phenyl; an aralkyl group such as benzyl; an alkaryl group such as tolyl or xylyl; or a cycloalkyl group of more than 3, and preferably from 6 to 10 carbon atoms such as cyclohexyl. Benzoguanamine, a commercially available phenyl substituted guanamine, is particularly useful in making amino resins for use in the practice of the invention. Other guanamines such as stearoguanamine may be used. Since these amino compounds are all reactive with hydroxyl groups, they are all useful in the present invention. However, melamine-formaldehyde resins generally are more stable in response to heat and light effects under stress conditions than resins prepared from a formaldehyde and urea or a guanamine, and are therefore preferred.

Since melamine is presently the amino compound preferred for the preparation of the amino-formaldehyde prepolymers for the practice of the present invention, the following discussion will emphasize the use of melamines. However, any suitable amino compound, or mixtures thereof, can be used in the preparation of the prepolymers which are useful in the present invention. For instance, mixtures of melamine and urea can be condensed with formaldehyde to produce an effective prepolymer condensate or resin. Similarly, the methylol amino compounds or resins can be used singly or in combination. Although methylol amino compounds can be used in monomer form for the practice of the present invention, prepolymeric resins are the preferred form for this additive.

The melamine prepolymers preferred in the present invention are based on melamine.

Formaldehyde can be added to any of the three amino groups in this molecule, forming as many as six methylol groups according to the formula

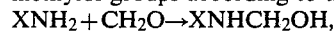

where X represents the melamine moiety. Melamines can be prepared which can be described as ranging from partially to completely methylolated, depending upon the average number of methylol groups per molecule.

These methylol groups can be treated with alcohols under suitable conditions to alkylate or "cap" the methylol groups, forming ethers according to the formula

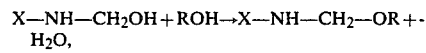

where R represents a lower alkyl group.

Various alcohols can be used, depending upon the alkyl groups it is desired to emplace and the resultant inhibition of reactivity, but methanol and n-butanol are preferred at present. Thus, a melamine which is partially or completely methylolated can further be at least partially alkylated, the degree of alkylation corresponding to the proportion of available methylol groups which are converted to ethers.

Melamines are converted into compounds which are useful as amino cross-linking agents by methylolation, and, optionally, alkylation. By carrying out the methylolation and alkylation reactions to varying degrees, melamine cross-linking agents can be produced which have the following varieties of reactive groups:

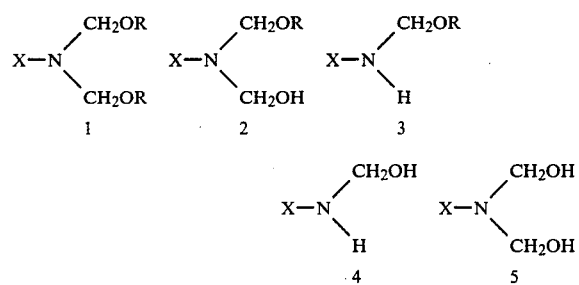

where X is the melamine moiety and R is a lower alkyl group, preferably methyl. These reactive groups can be described as (1) completely methylolated, completely alkylated; (2) completely methylolated, partially alkylated; (3) partially methylolated, completely alkylated; (4) partially methylolated, unalkylated; and (5) completely methylolated, unalkylated.

Most commercial amino resins used in surface coatings contain a variety of the above functional groups. Other groups may also be present such as methylene or ether bridges. But in most instances, the reactivity or behavior of the amino resin will be determined mainly by one of the above groups. Various suitable methylol melamine resins are available commercially from the American Cyanamide under the "CYMEL" trademark.

Amino resins used in coatings have functional groups falling predominantly in groups 1, 2, or 3. Group 4 functionality is mainly present in laminating, textile, or adhesive resins. Cross-linking agents containing such resins can be catalyzed by strong or weak acids, and display reactivity characteristics as shown in FIG. 1.

Generally, it has been believed that the degree of alkylation and methylolation of an amino resin determines its reactivity and performance behavior in a coating. Actually, the distribution of various functional groups on each nitrogen atom on an amino resin is the main determining factor for its overall performance characteristics. For use in accordance with the present invention, amino prepolymers are preferred which provide a balance between reactivity, stabilizing ability and the processability of the resulting composition. The prepolymers should be reactive enough to couple the oxymethylene polymer or other base polymer (under extrusion or molding conditions, but not before) without requiring the presence of a catalyst in excessive quantity or strength, or preferably not requiring a catalyst, but not so reactive as to react with itself in preference to the oxymethylene polymer. At present, the order of preference of such prepolymers for use in the invention is for prepolymers containing reactive groups 3, 2, 4, 1 and 5. Prepolymers having reactive group 3, typified by "CYMEL" resins 325 and 327, have the best overall balance of qualities, while those having reactive group 2, typified by "CYMEL" resins 370 and 380, are poorer stabilizers and less reactive. Prepolymers containing reactive group 4, typified by "CYMEL" resin 481, may also be used in the present invention, but tend to self-condense during processing, producing gels and lumps. Resins having reactive group 1, typified by "CYMEL" resin 301, are generally effective only with the use of strong acid catalysis due to their complete alkylation, and their use in this invention is therefore relatively unattractive. Resins containing reactive group 5 are generally unsuitable for use in the present invention, as the unalkylated methylol groups are too reactive, and the resins tend to self-condense during melt processing.

The amino prepolymers suitable for use in the present invention include those which are at least partially methylolated, with at least a portion of the methylol groups being alkylated or capped with an alkyl group having from 1 to about 4 carbon atoms, preferably methyl or n-butyl. Preferably, the amino prepolymer is at least about 30 mole percent methylolated, with the proportion of the methylol groups thus alkylated being in the range of from about 30 to about 90 mole percent. In an embodiment, the amino prepolymer is a melamine resin which is at least about 50 mole percent methylolated, at least about 80 percent of the methylol groups being alkylated. In another embodiment, a melamine resin can be used which is at least about 80 mole percent methylolated, with a proportion in the range of from about 70 to about 80 mole percent of the methylol groups being alkylated.

FIG. 1 shows the distribution of functional groups in various high solids amino cross-linking agents, the influence of this distribution of functional groups and the performance trend.

The reactive groups or combination of reactive groups in a high solids amino cross-linker can be easily read from the diamond. For example, "CYMEL" 303 resin is plotted between

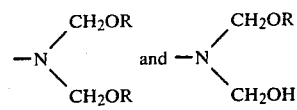

functional groups but very close to the

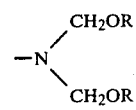

corner, therefore this resin is characterized as a highly alkylated melamine-formaldehyde resin with very low methylol content. "CYMEL" 385 resin, for example, is plotted between

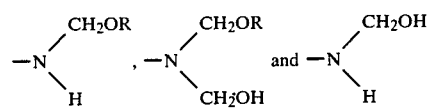

functionality. It, therefore, contains a combination of all three functional sites. Because it is positioned closer to

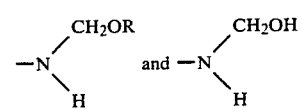

ps than to the

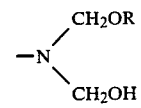

functionality, the former two functional groups dominate the performance characteristics.

Melamine resins having degrees of methylolation and alkylation preferred for use in the present invention are also indicated by the area falling within the line ABCDEFG of FIG. 1, representing resins which are not heavily methylolated and alkylated or "capped." A preferred group of resins excluding these highly methylolated and capped resins and the resins which are at least partially methylolated, but substantially unalkylated, lies within the area defined by the line ABCDFG of FIG. 1.

FIG. 1 is a plot within which any methylolated melamine resin, whether unalkylated, partially or completely alkylated, can be plotted so that its reactivity characteristics can be estimated. Resins which plot near the top of the diagram will be more responsive to strong acid catalysts, while those resins plotting near the bottom of the diagram will be more responsive to weak acid catalysts in coupling type reactions. Resins plotting near the left side tend to release more formaldehyde in coupling reactions, while resins plotting near the bottom of the diagram have a tendency to self-condense. Most of these resins are reactive with the hydroxyl and amide functional groups, but those plotting near the top of the diagram are more reactive with carboxylic acids.

The methylol melamine compounds or prepolymers discussed above are not resins per se, but these molecules can be condensed with the evolution of water to form resins. For the practice of the present invention, the methylol melamine compound can be used in monomeric form, but is preferably condensed to form a prepolymer in which the degree of polymerization is at least about 2, and preferably in the range of from about 2 to about 5. In other words, on the average the molecules are preferably condensed to form at least dimers, trimers, tetramers or pentamers. Since condensation polymerization can easily be stopped and re-started, the desired degree of polymerization can be easily produced. For example, the method of preparation of the melamine polymers is well known and forms no part of the instant invention. Preparation of the polymers is described, for example, in *Encyclopedia of Polymer Science and Technology*, Volume 2, 1965, pages 17 to 21 and in *Industrial and Engineering Chemistry*, Volume 44, November 1952, pages 2679 to 2686. Briefly, they are prepared by reacting melamine with a formaldehyde solution, heating to form the polymer, adding a 1 to 4 carbon lower aliphatic alcohol and heating to alkylate the polymer. More than 3 but less than 6 moles of formaldehyde should be used for each mole of melamine, preferably 4 or 5 moles of formaldehyde per mole of melamine. The proper amount of the alcohol should then be added per each mole of methylol to assure from 30 to 90 mole percent capping or alkylation, which is generally from 1.5 to 5.0 moles of alcohol per mole of melamine.

The resulting prepolymers can be tested by any suitable means known to those skilled in the art to determine the degree of polymerization, such as gel permeation chromatography, liquid chromatography, and other separation-based techniques, and colligative property determination methods such as cryoscopy, ebulliometry, and membrane osmometry.

Generally, for a given methylol melamine compound, the oligomers prepared therefrom have been found to be superior to the corresponding monomer for the practice of the present invention, as they do not require the same degree of acid catalysis for coupling, serve as effective plasticizers and provide compositions moldable into articles having superior tensile elongation and impact properties.

Suitable methylol melamine prepolymers can be prepared to meet the desired specifications, or selected from resins which are available commercially, such as, for example, those marketed under the "CYMEL" trademark by the American Cyanamid Co., Resins Department, Wayne, NJ 07470.

ACID CATALYSTS

The cross-linking reactions of most methylol amino monomer or prepolymers useful in the present invention can optionally be promoted or accelerated by the use of an acid catalyst. The acid catalyst should be chosen according to the reactivity characteristics of the resin. For example, it is known that a strong acid catalyst is necessary to obtain the optimum reaction rate from highly alkylated methylol melamine resins with low NH group content, the reaction rate being relatively low at near-neutral conditions and increasing as pH decreases. On the other hand, the reactivity of partially alkylated methylol melamine resins, and highly alkylated resins with high NH group content are less pH dependent, and their reaction rates level off as the pH of the system decreases.

For example, reaction rate studies in aqueous media, reported in the European Polymer Journal, Vol. 6, p. 98 (1970) show that at pH 5, the reaction rate of a hexamethoxymethyl melamine is less than those of partially alkylated or high NH group containing methylol melamine resins. At about pH 2, these rates are approximately equal, and below pH 2, the fully alkylated resins have the faster reaction rate. Thus, a strong acid catalyst generally produces the best reaction rate in fully alkylated methylol melamine resins, while better results are obtained by using weak acid catalysts with other resins which are partially alkylated and/or have a high content of NH groups.

The amino prepolymers useful in the present invention are thus preferably used in conjunction with an amount and type of acid catalyst effective to promote the cross-linking reactions of the amino prepolymer. The amount of the acid catalyst required to produce optimum results will vary widely, depending upon the reactivity of the prepolymers used and the type of catalyst, but an effective amount can easily be selected by persons skilled in the art. Generally the catalyst should be present in a concentration in the range of from about 0.0005 to about 0.1 weight percent of the molding composition. Alternatively, the catalyst can be present in an amount such that the weight ratio of catalyst to the amino resin is in the range of from about 0.001:1 to about 0.05:1.

For prepolymers which are substantially completely methylolated and alkylated, strong mineral or organic acids such as hydrochloric, phosphoric or organic sulfonic acids, or Lewis acids such as $ZnCl_2$ or $MgCl_2$, may be required. However, since strong acids can be harmful to oxymethylene polymers, preferably amino prepolymers are used which can be effectively promoted with weaker acids. These preferred acid catalysts can be selected from the group consisting of carboxylic acids having from about 2 to about 20 carbon atoms, Lewis acids such as boron fluoride and its complex compounds, latent acids (i.e., compounds which form acids when heated, such as amine blocked acids) and weak inorganic acids such as boric and phosphate acids. Acid catalysts preferred at present because of availability and proven effectiveness include lactic, oxalic and boric acids.

POLYURETHANE IMPACT MODIFIERS

Polyurethanes, preferably those characterized as thermoplastic and/or elastomeric, can optionally be incorporated in the compositions of the present invention (comprising at least one thermoplastic polymer and an amino monomer or prepolymer) to improve the tensile elongation, impact resistance and other physical properties of articles molded therefrom, as has been previously known in the art. These effects are enhanced by cross-linking reactions between the polyurethanes (e.g., the —NCO groups contained therein) and the methylol amino resins useful in the invention.

Polyurethanes suited for use in the compositions of the present invention can be selected from those commercially available or can be made by processes known in the art. (See, for example, Rubber Technology, 2nd edition, edited by Maurice Morton (1973), Chapter 17, Urethane Elastomers, D. A. Meyer, especially pp.453–6). Polyurethanes are derived from the reactions of polyester or polyether diols with diisocyanates and optionally also from the further reaction of such components with chain extending agents such as low molecular weight polyols, preferably diols, or with diamines to form urea linkages. Polyurethane elastomers are generally composed of soft segments, for example polyether or polyester polyols, and hard segments, usually derived from the reaction of the low molecular weight diols and diisocyanates. Polyurethane elastomers with no hard segments can be used to prepare compositions of the present invention. However, the polyurethanes most useful in the compositions of the present invention will contain both soft and hard segments.

In the preparation of the thermoplastic polyurethanes useful in the compositions of the present invention, a polymeric soft segment material having at least two hydroxyl groups per molecule and having a molecular weight of at least about 500, preferably from about 550 to about 5,000 and most preferably from about 1,000 to about 2,500, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably in the range of from about 0.95 to 1.08, more preferably 0.95 to 1.05, and most preferably, 0.95 to 1.00. In addition, monofunctional isocyanates or alcohols can be used to control molecular weight of the polyurethane.

Suitable polyester polyols include the polyesterification products of one or more dihydric alcohols with one or more dicarboxylic acids. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof, including small amounts of aromatic dicarboxylic acids. Suitable dihydric alcohols include ethylene glycol, 1,3- or 1,2-propylene glycol, 1,4-butanediol, 1,3-butanediol, 2-methyl pentane diol-1,5-diethylene glycol, 1,5-pentanediol, 1,5-hexanediol, 1,2-dodecanediol, and mixtures thereof.

Further, hydroxycarboxylic acids, lactones, and cyclic carbonates, such as ε-caprolactone and 3-hydroxybutyric acid can be used in the preparation of the polyester.

Preferred polyesters include poly(ethylene adipate), poly(1,4-butylene adipate), mixtures of these adipates, and poly ε-caprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol, and mixtures thereof. Suitable alkylene oxide condensates include those of ethylene oxide, propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, 1,2-propylene oxide and/or tetrahydrofuran (THF). Alternatively, a THF polyether copolymer with minor amounts of 3-methyl THF can also be used.

Preferred polyethers include poly(tetramethylene ether) glycol (PTMEG), poly(propylene oxide) glycol, and copolymers of propylene oxide and ethylene oxide, and copolymers of tetrahydrofuran and ethylene oxide. Other suitable polymeric diols include those which are primarily hydrocarbon in nature, e.g. polybutadiene diol.

Suitable organic diisocyanates include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, isomeric mixtures of 2,4- and 2,6-tolylene diisocyanate, 4,4'-methylene bis(phenylisocyanate), 2,2-diphenylpropane-4,4'diisocyanate, p-phenylene diisocyanate, m-phenylene diisocyanate, xylylene diisocyanate, 1,4-naphthylene diisocyanate, 1,5-naphthylene diisocyanate, 4,4'-diphenyl diisocyanate, azobenzene-4, 4'-diisocyanate, m- or p-tetramethylxylene diisocyanate and 1-chlorobenzene-2, 4-diisocyanate. 4,4'-Methylene bis(phenylisocyanate), 1,6-hexamethylene diisocyanate, 4,4'-dicyclohexylmethane diisocyanate and 2,3-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-a-glyceryl ether, 1,3-propanediol, 1,3-butanediol, 2,2-dimethyl-1,3-propanediol, 2,2-diethyl-1,3-propanediol, 2-ethyl-2-butyl-1,3-propanediol, 2-methyl-2,4-pentanediol, 2,2,4-trimethyl-1,3-pentanediol, 2-ethyl-1,3-hexanediol, 1,4-butanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1,3-propanediol, dihydroxyethyl ether of hydroquinone, hydrogenated bisphenol A, dihydroxyethyl terephthalate and dihydroxymethyl benzene and mixtures thereof. Hydroxyl terminated oligomers of 1,4-butanediol terephthalate can also be used, giving a polyester-urethane-polyester repeating structure. Diamines can also be used as chain extending agents giving urea linkages. 1,4-Butanediol, 1,2-ethanediol and 1,6-hexanediol are preferred.

In the preparation of the thermoplastic polyurethanes the ratio of isocyanate to hydroxyl should preferably be close to unity, and the reaction can be a one step or a two step reaction. Catalysts can be used, and the reaction can be can be run neat or in a solvent.

Elastomeric polyurethanes which are particularly useful in the molding compositions of the present invention, along with one-step and two-step procedures for their preparation, are disclosed in commonly assigned copending U.S. patent application Ser. No. 625,954, filed June 29, 1984, which is incorporated by reference herein. These elastomeric polyurethanes are the reaction products of:

(i) 4,4'-methylenebis(phenyl isocyanate),
(ii) polyoxytetramethylene glycol having a molecular weight within the range of about 1500 to about 3000, and
(iii) a diol extender selected from the group consisting of aliphatic straight chain diols having from 2 to about 6 carbon atoms, bis(2-hydroxyethyl) ether of hydroquinone, bis(2-hydroxyethyl) ether of resorcinol, and mixtures of any two or more of such diol extenders.

Preferably, the polyoxytetramethylene glycol has a molecular weight within the range of about 2000 to about 2900. The molecular weight of the polyoxytetramethylene glycol as used herein is a number average molecular weight. In addition to using polyoxytetramethylene glycols within the specified molecular weight ranges, it is also within the scope of the present invention to blend lower or higher molecular weight polyoxytetramethylene glycols with other molecular weight polyoxytetramethylene glycols so that the molecular weight of the final blend is within the above specified molecular weight ranges.

The term "aliphatic straight chain diols having from 2 to about 6 carbon atoms" means diols of the formula $HO(CH_2)_nOH$ wherein n is 2 to about 6 and there is no branching in the aliphatic chain separating the OH groups. The term is inclusive of ethylene glycol, 1,3-propanediol, 1,4-butanediol, 1,5-pentanediol and 1,6-hexanediol.

The preferred diol extenders are 1,4-butanediol, 1,6-hexanediol and the bis(2-hydroxy-ethyl) ether of hydroquinone; the most preferred diol extender being 1,4-butanediol.

The polyoxytetramethylene glycol and diol extender are used in the polyurethane reaction medium in a ratio of about 0.5 to about 2.5 equivalents (e.g., mole equivalents) of the diol extender per equivalent of the glycol. Preferably, the equivalents ratio is from about 1 to about 2. Most preferably the ratio is from about 1.2 to about 1.6 equivalents of diol extender per equivalent of the glycol when the polyoxytetramethylene glycol has a molecular weight of about 2000, and expecially when the diol extender is an aliphatic straight chain diol. When the hydroquinone or resorcinol extender are used, the equivalents ratio may be lower than the above-mentioned preferred ranged, for example, as low as about 0.5 equivalents of the extender per equivalent of the glycol.

Regardless of the particular polyurethane reaction method which is chosen, the hydroxyl components (i.e., the polyoxytetramethylene glycol and the diol extender) and the diisocyanate are used such that the overall ratio of isocyanate equivalents or groups to total hydroxyl equivalents or groups (glycol plus diol extender) is within the range of about 1:1 to about 1.08:1.0, and preferably is within the range of about 1.02:1.0 to about 1.07:1.0. The most preferred ratio of isocyanate (NCO) groups to total hydroxyl (OH) groups is within the range of from about 1.03:1.0 to about 1.06:1.0.

The term "equivalent(s)" as used with respect to the polyurethane preparation in the present specification and claims is based on the hydroxyl and isocyanate groups of the reactants.

A particular polyester polyurethane preferred because of its successful use in the examples herein is prepared from adipic acid, 1,4-butanediol and 1,2-ethanediol and 1,1-methylenebis(4-isocyanatobenzene), and is commercially available from Mobay Chemical under the trade name "TEXIN" 591A.

PREPARATION OF MOLDING COMPOSITIONS OF THE PRESENT INVENTION

The molding compositions of the present invention comprise from about 90 to about 50 percent, preferably from about 90 to about 70 weight percent, and most preferably from about 80 to about 70 weight percent of a thermoplastic polymer component comprising a major portion of an oxymethylene polymer.

The molding compositions further comprise an amount of a methylol amino monomer or prepolymeric resin effective to plasticize and couple the oxymethylene polymer and thus improve at least one physical property of objects molded of the composition comprising the oxymethylene polymer. The amino prepolymer is generally present in a quantity such that it amounts to greater than about ten weight percent of the molding composition, preferably in the range of from about 15 to about 35 weight percent. A suitable type and quantity of acid catalyst, as described above, can optionally be employed in an amount effective to promote the crosslinking reactions of the amino resin.

An amount of a polyurethane ranging from about 1 to about 40, preferably about 1 to 35, weight percent of the composition can optionally be present as an impact modifier. In the embodiments including the polyurethane impact modifier, the amino resin can be present in a quantity in the range of from about 1 to about 35 weight percent, preferably from greater than about 10 to about 35, and most preferably from about 12 to about 25 weight percent. Preferably, the amino prepolymer and polyurethane combined amount to from about 11 to about 50 weight percent of the composition. Reinforcing agents or fillers such as glass, mineral or organic fibers can optionally be included in suitable proportions.

The molding compositions may suitably be prepared by any conventional procedure that will result in an intimate blend or mixture of the components. Preferably, dry or melt blending procedures and equipment are used. For example, the amino resin, optional polyurethane and acid catalyst can be dry mixed with the oxymethylene polymer (in the form of pellets, chips, granules or powder) typically at room temperature or from about 180° upward, and preferably from about 185° C. to about 205° C.

Preferably, the oxymethylene polymer is dried before being subjected to the intimate blending procedure. The drying can be done in desiccated air having a dew point of about −30° C. to −40° C. or lower, at a temperature of from about 70° C. to about 110° C., and preferably above 80° C. The drying can also be accomplished in a vacuum oven, for example, at a temperature above about 90° C. The drying time will depend primarily on the moisture content, drying temperature, and particular equipment employed, but typically is from about 2 to about 6 hours or more. If the drying is conducted for longer periods of time, such as overnight, the drying temperature should preferably be about 70° C. to about 85° C. In general, any conventional drying procedure can be used to reduce the moisture content to below about 0.1 weight percent, based on the total weight of the oxymethylene polymer, preferably below about 0.05 weight percent, and most preferably below about 0.01 weight percent.

The oxymethylene molding composition resulting from the intimate blending procedure is then comminuted mechanically, for example by chopping, pelletizing or grinding, into granules, pellets, chips, flakes or powders, and processed in the thermoplastic state, for example by injection molding or extrusion molding, into shaped articles, for example, bars, rods, plates, sheets, films, ribbons, tubes and the like.

Preferably, the comminuted oxymethylene molding composition is dried (as discussed above) prior to being molded.

It is within the ambit of the present invention that the oxymethylene polymer molding composition also include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties of the resulting molding composition and the articles molded therefrom. The additional additives can be admixed at any convenient stage in the molding composition preparation.

Suitable formaldehyde scavengers which may be used include cyanoguanidine, melamines, amine-substituted triazine, other amidines, ureas, hydroxyl salts of calcium, magnesium, and the like, salts of carboxylic acids, and metal oxides and hydroxides. When acid catalysts are used, caution should be taken not to use such basic substances in quantities sufficient to react with and materially deplete the acid, which could retard the reaction rate.

Suitable mold lubricants include alkylene bis stearamide, long-chain amines, waxes, oils, and polyether glycides. The preferred mold lubricant is commercially available from Glyco Chemical, Inc. under the designation Acrawax C and is alkylene bis stearamide.

The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

An oxymethylene terpolymer such as commercially available from Celanese Corporation under the trademark "CELCON" U10 may also be added to the molding composition as a nucleant, preferably stablized by small amounts of Irganox 259 and calcium hydroxy stearate or cyanoguanidine.

Various suitable fillers and reinforcing agents known in the art can be used, including fibers and particulate matter of minerals and organic material such as glass or carbon fibers and fibers of synthetic and natural polymers, e.g., cellulosic fibers. Preferred mineral fillers include silaceous fillers such as silica, glass beads, processed mineral fibers, mica, talc, kaolin, feldspar, wollastonite (a natural calcium silicate) and nephelines. Other useful mineral fillers include metals, metal oxides, calcium carbonate, asbestos and boron filaments.

Objects molded from the oxymethylene molding compositions of the present invention exhibit enhanced elongational and impact properties, as indicated in the examples. When an effective amount of methylol amino prepolymer greater than 10 weight percent of the composition is used and objects are molded under suitable temperature and pressure conditions, at least one of the properties elongation at break, tensile impact and notched Izod impact strength are increased by at least about 20 percent compared with objects molded of similar compositions containing less than 10 weight percent of the methylol amino prepolymer; in some cases the increases can be at least about 50 percent. When a polyurethane was included in the composition, they exhibited enhanced flexural properties as well, and still higher levels of impact strength for a given total weight of additives (polyurethane plus amino resin). When effective amounts of methylol amino prepolymer and polyurethane are included and objects are molded under suitable temperature and pressure conditions, at least one of the properties elongation at break, notched Izod impact and flexural strength are increased by at least about 20 percent compared with objects molded of similar compositions without these additives; in some cases the increases in elongation and Izod impact properties can be at least 50 percent. Because of these properties, such oxymethylene molding compositions can be used to form molded objects of greater strength and toughness without added weight, or alternatively lighter objects of acceptable strength and toughness.

The following examples are given as specific illustrations of the claimed invention. It should be understood, however, that the specific details set forth in the examples are merely illustrative and in no wise limitative. All parts and percentages in the examples and the remainder of the specification are by weight of the total molding composition unless otherwise specified.

EXAMPLE I

The oxymethylene polymer used in this and some of the following examples was a mixture of solution-hydrolyzed and melt hydrolyzed trioxane-ethylene oxide copolymers containing about 98 weight percent of recurring —OCH$_2$— groups and about 2 weight percent of comonomer units derived from ethylene oxide having the formula —OCH$_2$CH$_2$—. The oxymethylene copolymer was prepared as previously has been described herein and more specifically in the aforementioned U.S. Pat. No. 3,027,352 to Walling et al, and had been hydrolyzed to stabilize the ends of the polymer chains. The oxymethylene copolymer possessed a crystallinity of approximately 75 percent, an inherent viscosity (I.V.) of approximately 1.3 (measured at 60° C. in a 0.1 weight percent solution in p-chlorophenol containing 2 weight percent of alphapinene), a melting temperature of 165° C., and a melt index of approximately 9.0 g./10 min. when tested in accordance with ASTM method D123882. This oxymethylene polymer was used as a molding composition including as stabilizers approximately 0.5 weight percent "Irganox" 259, 0.2 weight percent "Acrawax C" and 0.25 weight percent of "CELCON" U10, an oxymethylene terpolymer.

As preliminary tests, small proportions of various methylol melamine resins were blended with the oxymethylene polymer. The resulting compositions were used for molding standard parts, which were then tested for physical properties according to ASTM tests. The resins used included "CYMEL" 325, a half-methylolated, completely methylated melamine having a degree of polymerization of 2.3; "CYMEL" 327, a similar resin having a degree of polymerization of 1.8; "CYMEL" 370, a completely methylolated, partially methylated melamine having a degree of polymerization of 2.6; "CYMEL" 385, a partially methylolated, partially methylated melamine resin with a degree of polymerization of 2.1; "CYMEL" 481, a partially methylolated, unalkylated melamine with a degree of polymerization of 1.5; unsubstituted melamine, and cyanoguanidine.

In addition, extractable formaldehyde was measured for each compounded composition by the following procedure.

A 100 gram sample of polyoxymethylene resin was added to 100 ml of distilled water and refluxed at boiling for 60 minutes. The sample was neutralized with potassium hydroxide (0.10N) solution and the final pH noted. Fifty (50) milliliters of sodium sulfite solution (1.0M) was added to the neutralized solution. This final solution was then titrated with sulfuric acid (0.10N) to the original pH level noted previously. A value for the formaldehyde level was calculated from the following formula:

$$\% \text{ Formaldehyde} = \frac{T_b \times N(H_2SO_4) \times 3.0}{\text{Sample wt. in grams}}$$

$T_b$ = ml of acid
N = normality of $H_2SO_4$

The properties of parts molded of these compositions are presented in TABLE I.

nism of these improvements may be through the plasticization of the resin with a low molecular weight, compatible, and reactive material. (The oxymethylene polymers and amino resins are expected to be compatible due to their common formaldehyde components.)

Using the same oxymethylene polymer blend with 20 weight percent of polyurethane impact modifier ("TEXIN" 591A, previously described), the results of the addition of 1 weight percent of a methylol melamine resin ("CYMEL" 327, previously described) were determined by testing the properties of molded articles. The results, presented in TABLE II, indicate that even this small amount of a methylol melamine resin added to

TABLE I

PROPERTIES OF POLYOXYMETHYLENE CONTAINING METHYLOL MELAMINE RESINS

| Polymer* Additives (Amount) | Tensile St. at Yield (psi) | Elong. at BK (%) | Notched Izod ft. lbs/in. | Flex St. (psi) | Flex Mod $10^6$ | Ext. $CH_2O$ % | Vol. % | Hunter Color L | A | B |
|---|---|---|---|---|---|---|---|---|---|---|
| 1 "CYMEL" 325** 0.25% | | | | | | .028 | .15 | 94.4 | −1.3 | 4.0 |
| 2 "CYMEL" 327** 0.25% | 8630 9725 | 64 45 | 1.34 1.46 | 12,940 14,125 | 0.380 0.437 | .027 | .27 | 94.0 | −1.6 | 4.5 |
| 3 "CYMEL" 370** 0.25% | | | | | | .033 | .13 | 95.0 | −1.4 | 3.35 |
| 4 "CYMEL" 385** 0.25% | | | | | | .043 | .14 | 94.7 | −1.4 | 3.25 |
| 5 "CYMEL" 481** 0.25% | | | | | | .044 | .15 | 95.8 | −1.41 | 3.50 |
| 6 Melamine 0.25% | 8800 HS 9725 | 32 21 | 1.27 1.54 | 13,004 14,241 | 0.370 0.429 | .020 | .30 | 94.1 | −1.41 | 4.30 |
| 7 CNG 0.25% | HS 9675 | 29 | 1.46 | 14,270 | 0.437 | .028 | .14 | 95.6 | −2.2 | 5.3 |
| 8 "CYMEL" 327** 1% | 8810 HS 9875 | 57 41 | 1.36 1.46 | 12,748 14,425 | 0.372 .447 | .044 | .20 | 95.5 | −1.51 | 3.6 |
| 9 "CYMEL" 327** 5% | 8000 HS 10,100 | 86 47 | 1.45 1.31 | 10,639 14,927 | .303 .462 | .030 | .32 | 95.4 | −1.52 | 3.8 |
| 10 "CYMEL" 327** 1% + 0.01% Lactic Acid | 8940 HS 9800 | 58 29 | 1.37 1.46 | 13,159 14,405 | .387 .437 | .050 | .19 | 95.5 | −1.5 | 3.64 |
| 11 "CYMEL" 327** 5% + 0.01% Lactic Acid | 8500 HS 9800 | 67 51 | 1.43 1.36 | 13,157 13,983 | .384 .437 | .038 | .17 | 95.0 | −1.51 | 3.82 |

HS = 130° C./10 days/hot air
*a polyoxymethylene containing a stabilizer package, as identified in text.
**"CYMEL" resins identified in text.
CNG = cyanoguanidine This work demonstrated that improved elongational properties could be obtained with the addition of methylol melamine resins to oxymethylene polymers. Some losses of tensile strength were noted with the addition of these resins, but these proved to be reversible with heat treatment to a certain extent. The elongational properties of oxymethylene polymers are related to the impact properties and some improvement in the impact properties would thus be expected if substantial increases in the elongation levels of the oxymethylene polymers could be effected (e.g., if higher levels of methylol melamine resin were incorporated in the resin structure). While not wishing to be bound by theory, the mechaan impact-modified oxymethylene polymer can improve tensile, flexural and impact properties.

TABLE II

PROPERTIES OF MOLDED IMPACT-MODIFIED POLYOXYMETHYLENE CONTAINING POLYURETHANE AND METHYLOL MELAMINE RESIN

| Polymer$^a$ + Additive | Urethane$^b$ percent | Tensile yd. psi × $10^3$ | Tensile BK psi × $10^3$ | Elong. BK percent | Tensile Modulus psi × $10^6$ | Flex Str. psi × $10^3$ | Flex Modulus psi × $10^6$ | Notched Izod ft. lb/in. | Ext. Form. percent |
|---|---|---|---|---|---|---|---|---|---|
| Control No Additive | 20 | 5.64 | 2.89 | 78.7 | .216 | 6.85 | .211 | 1.04, 1.08 | .030 |
| "CYMEL" 327$^c$ (1%) | 20 | 5.77 | 5.06 | 92.9 | .232 | 7.16 | .217 | 1.19, 1.24 | .036 |

$^a$"CELCON" M90-04, a polyoxymethylene described earlier
$^b$"TEXIN" 591A, a polyurethane described earlier
$^c$Trimethylated trimethylol melamine with a degree of polymerization of 1.8.

EXAMPLE II

"CYMEL" 325, a half methylolated, fully methylated melamine prepolymer resin having a degree of polymerization of about 2.3, was added to the same oxymethylene polymer flake in conjunction with a stabilizer package of "Irganox" 259, "Acrawax C" and stabilized oxymethylene terpolymer "CELCON" U10 and then mixed in a Henschel blender to assure uniform mixing and dispersion of the material in the final compositions, which contained various percentages of the oxymethylene polymer and melamine resin, 0.5 percent by weight "Irganox" 259, 0.2 percent by weight "Acrawax C", and 0.25 percent by weight "CELCON" U10, weight percentages being based on the total weight of the composition. The compositions were prepared with and without 0.01 weight percent of lactic acid as a catalyst. A control composition was prepared without the melamine resin.

The resulting compositions were rear fed into a 1½" Johnson extruder which was used to compound the materials. The following conditions were used:
 barrel temperature: 380°–390° F.
 die temperature: 380°–390° F.
 vented with vacuum 25" Hg
 feed rate: 50 lbs/hr The resulting pellets were dried and then molded into standard ASTM parts for physical testing. A 6 oz. Cincinnati Milacron Injection Molding machine was used under standard molding conditions, i.e., barrel temperature 380° F. or 420° F., nozzle temperature 390° F., mold temperature 200° F., injection pressure 1100 psi and total cycle time 51 sec. to obtain the parts. All parts were molded under two barrel temperature conditions (380° F. versus 420° F.), so that some insight could be obtained as to the optimal processing temperature and to demonstrate the effect of processing temperature versus resin reactivity and catalysis. In some instances black specks and discoloration were obtained at the higher molding temperature conditions. In addition, 4 inch disks were molded for warpage measurements.

The resulting parts were subjected to standard ASTM tests. In addition, warpage and shrinkage measurements were performed. The shrinkage measurements were performed by determining the dimensions (length/width) of a flex bar with accurate (±0.002) calipers and comparing it to the mold dimensions. Warpage measurements were obtained by molding a 4"×1/16" disc as above. The resulting discs were measured for flatness using the Ono Sokki Digital Linear Gauge. Measurements were taken in the flow and transverse directions on the discs. A hand held micrometer was then used to measure the thickness of the disc at several points. The thickness measurement was subtracted from the flatness measurement to yield a warpage measurement. Measurements in the flow and transverse direction were reported.

Further compositions tested are set forth in Table III.

TABLE III

OXYMETHYLENE POLYMER-MELAMINE TEST COMPOSITIONS

| Composition | "CYMEL" 325% | Catalyst Lactic Acid % | "CELCON"[a] | "CELCON"[b] |
|---|---|---|---|---|
| 1 | 1.0 | .01 | 98.99 | |
| 2 | 1.0 | — | 99 | |
| 3 | 12 | .01 | 87.99 | |
| 4 | 12 | — | 88 | |
| 5 | 20 | .01 | 79.99 | |
| 6 | 33 | .01 | 66.99 | |
| 7 | | | 100 | |
| 8 | | | | 100 |

[a] The oxymethylene copolymer previously described, including stabilizers.
[b] A similar oxymethylene polymer, having a melt index of 2.5 g/10 min., and containing the same stabilizers.

The results of testing parts molded of these compositions at two different molding temperatures are set forth in TABLES IV and V.

The data in TABLES IV and V quite clearly delineate the effects of the melamine resin level on the elongational, impact, and tensile properties of the oxymethylene molding compositions. Elongational properties rose almost linearly with resin concentration for formulations molded at either 380° or 420° F., with the 380° F. molded formulations exhibiting a steeper slope. This increase in elongation was mirrored by notched Izod and tensile impact properties increases. Notched Izod rose from 0.95 to 1.4 ft lbs/in in formulations molded at either 380° or 420° F., while tensile impact increased from 115 to 160 ft lb/in. These results appeared to be independent of the presence of catalyst under the test conditions employed. Flexural modulus and tensile strength exhibited a decrease in property levels with increasing resin concentration (2.9 versus 3.75×10$^5$ psi Flex. Mod. and 8900 versus 7200 psi tensile strength). However, this effect is not as large as has been found with other additives at the 33 percent concentration level, e.g., polyurethanes.

TABLE IV

THE EFFECT OF METHYLOL MELAMINE RESINS ON OXYMETHYLENE POLYMER PROPERTIES

| Composition | | Tensile Strength Yield psi | Tensile Strength Break psi | Elongation bk percent | Tensile Modulus psi × 10$^5$ | Flexural Strength psi | Flexural Modulus psi × 10$^5$ | Notched Izod ft. lb/in. | Tensile Impact ft. lbs. in$^2$ | Gardner Impact in. lbs |
|---|---|---|---|---|---|---|---|---|---|---|
| 1 | A | 8,901 | 7,933 | 27.8 | 3.99 | 11,885 | 3.66 | .944 | 116.3 | 13–15.0 |
|   | B | 8,937 | 7,731 | 34.1 | 3.98 | 11,817 | 3.63 | .88 | 74.3 | 10–13 |
| 2 | A | 8,894 | 8,894 | 21.2 | 3.94 | 12,044 | 3.77 | .960 | 99.2 | 30–35 |
|   | B | 8,984 | 7,887 | 33.9 | 3.89 | 11,999 | 3.71 | .894 | 122.3 | 5–7.5 |
| 3 | A | 8,082 | 6,905 | 38.5 | 3.36 | 10,370 | 3.15 | .840 | 83.3 | 15–18.0 |
|   | B | 8,263 | 7,230 | 40.7 | 3.36 | 11,266 | 3.39 | 1.05 | 128.7 | 35–40.0 |
| 4 | A | 7,974 | 6,753 | 38.2 | 3.14 | 10,197 | 3.08 | .891 | 104.4 | 5–7.5 |
|   | B | 8,206 | 7,304 | 28.4 | 3.43 | 10,917 | 3.33 | .934 | 103.0 | 2.5–5.0 |
| 5 | A | 5,945 | 5,971 | 49.8 | 3.96 | 8,916 | 2.85 | 1.24 | 120 | — |
|   | B | 7,411 | 6,186 | 44.8 | 4.02 | 9,935 | 3.14 | 1.13 | 147.2 | — |
| 6 | A | 7,216 | 6,042 | 66.4 | 3.74 | 9,177 | 2.43 | 1.43 | 160 | — |
|   | B | 7,050 | 6,138 | 45.7 | 3.58 | 9,132 | 2.90 | 1.25 | 164 | — |
| 7 | A | 8,748 | 8,351 | 15.86 | 5.39 | 11,711 | 3.75 | .881 | 72.98 | 2.5–5.0 |
|   | B | 8,454 | 7,271 | 32.5 | 5.09 | 11,381 | 3.64 | .830 | 96.64 | 10–13.0 |
| 8 | A | 8,380 | 7,215 | 40.65 | 5.28 | 11,354 | 3.68 | 1.10 | 165.5 | 5–7.5 |
|   | B | 8,637 | 7,367 | 45.9 | 5.38 | 11,688 | 3.76 | 1.04 | 106.4 | 7.5–10.0 |

| Composition | | HDT* w/254 psi, °C. | Hunter Color L | A | B | Strength Length % | Width % | Warpage Flow in. | Transverse in. | Extractable Formaldehyde percent |
|---|---|---|---|---|---|---|---|---|---|---|
| 1 | A | 101 | 92.95 | −1.5 | 3.18 | 1.70 | .88 | .011 | .012 | .03 |

TABLE IV-continued
THE EFFECT OF METHYLOL MELAMINE RESINS ON OXYMETHYLENE POLYMER PROPERTIES

|   |   |     |       |       |       |      |      |       |       |      |
|---|---|-----|-------|-------|-------|------|------|-------|-------|------|
|   | B | 102 | 94.2  | −1.9  | 5.47  | 1.96 | 1.0  |       |       |      |
| 2 | A | 100 | 94.82 | −1.37 | 2.71  | 1.73 | .88  | .0080 | .0048 | .026 |
|   | B | 105 | 93.35 | −2.29 | 5.56  | 1.94 | 1.0  |       |       |      |
| 3 | A | 81  | 96.02 | −2.37 | 5.55  | 1.85 | .88  | —     | —     | .15  |
|   | B | 92  | 94.28 | −3.00 | 13.6  | 2.20 | 1.12 |       |       |      |
| 4 | A | 84  | 96.17 | −2.8  | 7.58  | 1.88 | .88  | .0098 | .0062 | .14  |
|   | B | 91  | 94.48 | −3.32 | 12.93 | 2.14 | 1.04 |       |       |      |
| 5 | A | —   | 94.1  | −3.14 | 15.1  | 1.96 | .92  | .076  | .039  | .041 |
|   | B | —   | 90.9  | −2.31 | 16.2  | 2.16 | 1.32 |       |       |      |
| 6 | A | —   | 95.83 | −3.23 | 11.24 | 2.00 | .88  | .006  | .0100 | .017 |
|   | B | —   | 90.9  | −2.26 | 19.4  | 2.13 | 1.12 |       |       |      |
| 7 | A | 90  | 95.3  | −1.62 | 5.41  | 1.94 | 1.08 | .0069 | .005  | —    |
|   | B | 98  | 91.6  | −1.9  | 6.10  | 1.9  | 1.0  |       |       |      |
| 8 | A | 104 | 93.05 | −1.61 | 6.07  | 1.89 | 1.0  | .0050 | .0031 | —    |
|   | B | 95  | 91.6  | −2.06 | 8.27  | 2.11 | 1.2  |       |       |      |

A = Molded at 380° F.
B = Molded at 420° F.
*Heat Deflection Temperature

TABLE V
SUMMARY OF METHYLOL MELAMINE/OXYMETHYLENE DATA

| | Concentration of resin | Notched Izod ft. lbs/in | Tensile Impact ft. lbs/in$^2$ | Gardner Impact in. lbs | Tensile Strength psi | Elongation at bk, % | Flex Modulus psi × 10$^5$ |
|---|---|---|---|---|---|---|---|
| Catalyzed | | | | | | | |
| A | 0.0 | .881 | 73.0 | 2.5–5 | 8750 | 15.9 | 3.75 |
| B |     | .830 | 96.6 | 10–13 | 8454 | 32.5 | 3.64 |
| A | 1.0 | .94  | 116  | 13    | 8901 | 27.8 | 3.66 |
| B |     | .88  | 74.3 | 10    | 8937 | 34.1 | 3.63 |
| A | 12.0 | .84 | 83.3 | 15    | 8082 | 38.5 | 3.15 |
| B |     | 1.05 | 128.7 | 35   | 8263 | 40.7 | 3.39 |
| A | 20.0 | 1.24 | 120 | —    | 6945 | 49.8 | 2.85 |
| B |     | 1.13 | 147.2 | —   | 7411 | 44.8 | 3.14 |
| A | 33.0 | 1.43 | 160 | —    | 7216 | 66.4 | 2.93 |
| B |     | 1.25 | 164 | —    | 7050 | 45.7 | 2.90 |
| Uncatalyzed | | | | | | | |
| A | 1.0 | .96  | 99.2  | 30  | 8894 | 21.2 | 3.77 |
| B |     | .89  | 122.3 | 5   | 8984 | 33.9 | 3.71 |
| A | 12  | .891 | 104.4 | 5   | 7974 | 38.2 | 3.08 |
| B |     | .934 | 103.0 | 2.5 | 8206 | 28.4 | 3.33 |

A = Molded at 380° F.
B = Molded at 420° F.

It is apparent that elongation increases with increasing amounts of the amino resin in the catalyzed composition, e.g., over 50 percent increase between 12 percent and 33 percent resin at the molding temperature of 380° F., with smaller increases observed at the higher temperature of 420° F. Tensile impact and Notched Izod also increase, although tensile strength and flexural modulus decrease.

EXAMPLE III

Test parts were molded of compositions prepared from an oxymethylene copolymer similar to that of Examples I and II, but having a melt index of 2.5 g/10 min. and including the same stabilizers, plus 10 weight percent of a commercial polyurethane impact modifier ("TEXIN" 591A, described earlier). The properties of compositions containing a lactic acid-catalyzed melamine resin were compared with those of compositions without such additives.

The test results are set forth in TABLE VI. The addition of only 1 percent methylol melamine resin to the impactmodified oxymethylene polymer composition increases elongation at break, with the effects on other test parameters varying with molding temperature. Generally, the best improvements were obtained at the higher molding temperature of 420° F.

TABLE VI
THE EFFECT OF METHYLOL MELAMINE RESIN ON OXYMETHYLENE/POLYURETHANE BLENDS

| Composition$^a$ | | Tensile Yield psi | Tensile Break psi | Elongation Percent | Tensile Modulus psi × 10$^5$ | Flexural Strength psi | Flexural Modulus psi × 10$^5$ | Notched Izod ft. lbs./in. | Tensile Impact ft. lbs/in.$^2$ |
|---|---|---|---|---|---|---|---|---|---|
| 1 | A | 7,740 | 6,954 | 36.7 | 4.66 | 10,637 | 3.45 | .924 | 70.6  |
|   | B | 7,138 | 6,220 | 49.2 | 4.14 | 9,144  | 2.89 | 1.24 | 96.2  |
| 2 | A | 7,033 | 6,388 | 35.7 | 3.92 | 9,325  | 2.97 | 1.06 | 107.7 |
|   | B | 7,736 | 6,240 | 42.2 | 4.67 | 10,173 | 3.15 | 1.15 | 114.0 |

| Composition$^a$ | | Hunter Color L | A | B | Shrinkage Length Percent | Shrinkage Width Percent | Extractable Formaldehyde Percent |
|---|---|---|---|---|---|---|---|
| 1 | A | 91.6 | −2.4 | 9.70  | 1.86 | .92  | .050 |
|   | B | 92.1 | −2.0 | 15.41 | 2.22 | 1.28 |      |

TABLE VI-continued

THE EFFECT OF METHYLOL MELAMINE RESIN ON
OXYMETHYLENE/POLYURETHANE BLENDS

| | | | | | | | |
|---|---|---|---|---|---|---|---|
| 2 | A | 92.6 | −2.2 | 8.36 | 1.76 | .96 | .014 |
| | B | 94.3 | −2.6 | 12.5 | 2.15 | 1.28 | |

<sup>a</sup>Composition 1 - 88.99% oxymethylene, 10% "TEXIN" 591A, 1.0% "CYMEL" 325 and 0.01% lactic acid.
Composition 2 - 90% oxymethylene, 10% "TEXIN" 591A.
A — Molding temperature 380° F.;
B — Molding temperature 420° F.

Although the invention has been described with preferred embodiments, it is to be understood that variations and modifications can be employed without departing from the gist of the invention. For example, in addition to the oxymethylene polymers exemplified herein, suitable polymers for practice of the present invention include polymers having suitable functional end groups (hydroxyl, amine or amide) such as polyamides, polyimines, polyamines, carboxylated polymers (e.g., carboxymethyl cellulose), cellulosic polymers and other related natural polymers and their derivatives, hydroxyl-containing acrylates, proteins, polyurethanes, hydroxyl or carboxyl-containing polyesters, polyarylates, polycarbonates, and the like.

We claim:

1. A molding composition comprising a major portion of at least one oxymethylene polymer and an amount of an amino prepolymer selected from condensation products of formaldehyde and at least one of guanidine, urea, a substituted or unsubstituted guanamine and melamine effective to improve at least one of the elongational, flexural and impact properties of objects molded of said composition, said amino prepolymer being present as an amount in the range of from 12 to about 35 weight percent of said composition.

2. A molding composition in accordance with claim 1, wherein said amino prepolymer is a condensation product of formaldehyde and melamine.

3. A molding composition in accordance with claim 1, wherein said amino prepolymer is at least partially methylolated, with a proportion in the range of from about 30 to about 90 mole percent of the methylol groups being alkylated with groups having from 1 to about 4 carbon atoms.

4. A molding composition in accordance with claim 3, wherein said amino prepolymer is at least about 30 mole percent methylolated.

5. A molding composition in accordance with claim 3, wherein the proportion of the methylol groups thus alkylated is in the range of from about 60 to about 80 mole percent.

6. A molding composition in accordance with claim 2, wherein said amino prepolymer is a melamine prepolymer which is at least about 50 mole percent methylolated, at least about 80 mole percent of said methylol groups being thus alkylated.

7. A molding composition in accordance with claim 2, wherein said amino prepolymer is a melamine prepolymer which is at least about 80 mole percent methylolated, with a proportion in the range of from about 40 to about 90 mole percent of said methylol groups being thus alkylated.

8. A molding composition in accordance with claim 1, wherein said amino prepolymer is a melamine prepolymer having degrees of methylolation and alkylation falling within the area defined by the line ABCDEFG in FIG. 1, and further comprising a quantity of an acid catalyst effective to promote the crosslinking reactions of said amino resin.

9. A molding composition in accordance with claim 1, wherein said amino prepolymer is a melamine prepolymer having degrees of methylolation and alkylation falling within the area defined by the line ABCDFG of FIG. 1, and further comprising a quantity of an acid catalyst effective to promote the crosslinking reactions of said amino resin.

10. A molding composition in accordance with claim 1, wherein said methylol amino prepolymer has a degree of polymerization in the range of from about 2 to about 5.

11. A molding composition in accordance with claim 1, wherein said amino prepolymer is a prepolymeric condensation product of formaldehyde and melamine having a degree of polymerization in the range of from about 2 to about 5.

12. A molding composition in accordance with claim 1, further comprising a quantity of an acid catalyst effective to catalyze the cross-linking-reactions of said amino prepolymer and selected from the group consisting of weak mineral acids, carboxylic acids containing from 1 to about 20 carbon atoms, latent acids and Lewis acids.

13. A molding composition in accordance with claim 1, further comprising at least one of filler and reinforcing agent selected from glass, minerals and organic fibers and fillers.

14. A molding composition in accordance with claim 1, wherein said oxymethylene polymer is selected from the group consisting of:

(i) oxymethylene homopolymer,
(ii) oxymethylene copolymer comprising about 85 to about 99.9 percent recurring —OCH$_2$— groups interspersed with groups of the formula:

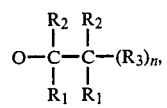

wherein each R$_1$ and R$_2$ is independently selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C., and (iii) oxymethylene terpolymer, which is the reaction product of trioxane, a cyclic ether and/or cyclic acetal, and a diglycide of the formula:

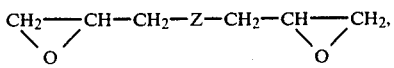

wherein Z is selected from the group consisting of a carbon-to-carbon bond, oxygen, an oxyalkoxy of 1 to 8 carbon atoms, and an oxypoly(lower alkoxy).

15. A molding composition in accordance with claim 1, further comprising an amount of a polyurethane effective to improve impact properties of molded articles.

16. A molding composition in accordance with claim 15, wherein said polyurethane is present as an amount in the range of from about 1 to about 40 weight percent of said composition and the amino prepolymer and polyurethane combined amount to from about 11 to about 50 weight percent of said composition.

17. A molding composition in accordance with claim 15, wherein said polyurethane is derived from the reaction of a polyester or polyether diol with a diisocyanate.

18. A molding composition in accordance with claim 17, wherein the reaction product of said polyester or polyether diol and said diisocyanate is further reacted with a chain-extending agent or a diamine.

19. A molding composition in accordance with claim 15, wherein said polyurethane is a polyester polyurethane prepared from adipic acid, 1,4-butanediol and 1,2-ethanediol and 1,1'-methylenebis(4-isocyanatobenzene).

20. A molding composition comprising at least 50 weight percent of an oxymethylene polymer, from about 1 to about 35 weight percent of a polyurethane impact modifier, from about 1 to about 35 weight percent of a methylol melamine prepolymer having a degree of polymerization in the range of from about 2 to about 5, and from 0 to about 0.1 weight percent of an acid catalyst.

21. A molding composition comprising at least about 50 weight percent, of an oxymethylene polymer, from 12 to about 35 weight percent of a methylol melamine prepolymer having a degree of polymerization in the range of from about 2 to about 5, from 0 to about 35 weight percent of a polyurethane impact modifier, and from 0 to about 0.1 weight percent of an acid catalyst.

22. An oxymethylene polymer molding composition comprising a blend of:
(a) a major portion of an oxymethylene polymer,
(b) an amount in the range of from 12 to about 35 weight percent of at least one amino prepolymer, selected from condensation products of formaldehyde with at least one of guanidine, melamine, urea, guanamine or a substituted guanamine and having a degree of polymerization in the range of from about 2 to about 5, and
(c) an amount of an acid catalyst effective to promote the cross-linking reactions of said amino resin.

23. A molding composition in accordance with claim 22, wherein said oxymethylene polymer is selected from the group consisting of:
(i) oxymethylene homopolymer,
(ii) oxymethylene copolymer comprising about 85 to about 99.9 percent recurring —OCH$_2$— groups interspersed with groups of the formula:

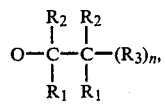

wherein each $R_1$ and $R_2$ is independently selected from the group consisting of hydrogen, lower alkyl and halogen-substituted lower alkyl radicals, each $R^3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl and haloalkyl radical having from 1 to 2 carbon atoms, inclusive, said copolymer having a number average molecular weight of at least 10,000 and a melting point of at least 150° C., and
(iii) oxymethylene terpolymer, which is the reaction product of trioxane, at least one of a cyclic ether and a cyclic acetal, and a diglycide of the formula:

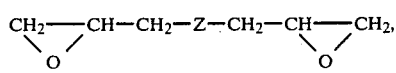

wherein Z is selected from the group consisting of a carbon-to-carbon bond, oxygen, an oxyalkoxy of 1 to 8 carbon atoms, and an oxypoly(lower alkoxy).

24. A process of producing molded objects from a thermoplastic molding composition comprising mixing an oxymethylene polymer and from 12 to about 35 weight percent of a methylol amino prepolymer under temperature and pressure conditions effective to improve at least one of the properties selected from the group consisting of elongation at break, tensile impact and notched Izod impact strength of said molded objects by at least about 20 percent compared with objects molded of such compositions comprising less than 10 weight percent of said methylol amino prepolymer.

25. A process in accordance with claim 24, further comprising a step of heat setting said molded objects by subjecting said objects to elevated temperatures above 50° C. for a period of time sufficient to increase the tensile strength of said objects.

26. A process in accordance with claim 24, wherein said composition further comprises an amount of an acid catalyst effective to promote the cross-linking reactions of said amino resin.

27. A process in accordance with claim 24, wherein the amount of said methylol amino prepolymer present is effective to increase at least one of said properties of said molded objects by at least about 50 percent.

28. A process of producing molded objects from a thermoplastic molding composition comprising mixing a major portion of an oxymethylene polymer, an amount of a polyurethane effective to improve the impact and elongational properties of said molded objects, a methylol amino prepolymer in an amount effective to improve the elongational and flexural properties of said molded objects, and from 0 to about 0.1 weight percent of an acid catalyst to promote the cross-linking reactions of said prepolymer, such that at least one of the properties selected from the group consisting of elongation at break, notched Izod impact strength and flexural strength are increased by at least about 20 percent compared with objects molded of similar compositions without said polyurethane or said amino prepolymer.

29. A process in accordance with claim 24, wherein the molding temperature is at least about 190° C.

30. A process in accordance with claim 28, wherein the amounts of said methylol amino prepolymer and said polyurethane present are effective to increase at least one of said properties of said molded objects by at least about 50 percent.

* * * * *